(12) United States Patent
Nunokawa

(10) Patent No.: US 8,428,757 B2
(45) Date of Patent: Apr. 23, 2013

(54) REPRODUCING APPARATUS AND REPRODUCING METHOD

(75) Inventor: Katsuhiko Nunokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1229 days.

(21) Appl. No.: 11/944,474

(22) Filed: Nov. 23, 2007

(65) Prior Publication Data

US 2008/0154406 A1 Jun. 26, 2008

(30) Foreign Application Priority Data

Dec. 25, 2006 (JP) ................. 2006-347781

(51) Int. Cl.
*G06F 17/00* (2006.01)
(52) U.S. Cl.
USPC ........................................... 700/94
(58) Field of Classification Search .......... 700/94; 369/1–12; 704/500–504
See application file for complete search history.

(56) References Cited

U.S. PATENT DOCUMENTS

| 6,772,212 B1* | 8/2004 | Lau et al. ............... 709/228 |
| 2005/0027740 A1* | 2/2005 | Moritani et al. ........ 707/104.1 |
| 2005/0240297 A1* | 10/2005 | Scotzin et al. ............. 700/94 |

FOREIGN PATENT DOCUMENTS

| JP | 2001-6276 | | 1/2001 |
| JP | 2003-5947 | | 1/2003 |
| JP | 2003-50589 | A | 2/2003 |
| JP | 2005-45510 | | 2/2005 |
| JP | 2006-286058 | A | 10/2006 |
| JP | 2006-287379 | A | 10/2006 |

OTHER PUBLICATIONS

Japanese Office Action issued on May 24, 2011 in corresponding Japanese Application No. 2006-347781.

* cited by examiner

*Primary Examiner* — Andrew C Flanders
(74) *Attorney, Agent, or Firm* — Oblon, Spivak, McClelland, Maier & Neustadt, L.L.P.

(57) ABSTRACT

Disclosed herein is a reproducing apparatus including: an interface section configured to have a plurality of ports each connectable with a portable player including a storage medium; an integrated content management data creation section configured to identify the portable players; a reproduction content designation section configured to designate the content data to be reproduced in accordance with the integrated content management data; a content access section configured to gain access through the interface section; and a reproduction section configured to reproduce the accessed content.

10 Claims, 7 Drawing Sheets

FIG. 5

|   | GENRE | ARTIST | ALBUM | SONG TITLE | FILE NAME |
|---|-------|--------|-------|------------|-----------|
| 1 | ROCK | MJ | AA | ABC | ABC.mp3 |
| 2 | ROCK | MJ | AA | XYZ | XYZ.mp3 |
| 3 | POPS | DJ | BB | BCD | BCD.at3 |
| ⋮ | | | | | |
| N | JAZZ | ZJ | ZZ | ZYX | XYZ.mp4 |

FIG. 6A

|   | GENRE | ARTIST | ALBUM | SONG TITLE | FILE NAME |
|---|-------|--------|-------|------------|-----------|
| 1 | ROCK | MJ | AA | ABC | ABC.mp3 |
| 2 | ROCK | MJ | AA | XYZ | XYZ.mp3 |
| 3 | POPS | DJ | BB | BCD | BCD.at3 |
| ⋮ | | | | | |
| N | JAZZ | ZJ | ZZ | ZYX | ZYX.mp4 |

FIG. 6B

|   | GENRE | DIRECTOR | TITLE | FILE NAME |
|---|-------|----------|-------|-----------|
| 1 | DOCUMENTARY | | MMM | MMM.mpg |
| 2 | ACTION | MD | NNN | NNN.mpg |
| 3 | DRAMA | MG | LLL | LLL.mpg |
| ⋮ | | | | |
| N | DRAMA | MH | HHH | HHH.mpg |

FIG. 7

| | DEVICE ID | | GENRE | ARTIST | ALBUM | SONG TITLE | FILE NAME |
|---|---|---|---|---|---|---|---|
| 1 | DEVICE ID#2 | 1 | ROCK | MJ | AA | ABC | ABC.mp3 |
| 2 | DEVICE ID#2 | 2 | ROCK | MJ | AA | XYZ | XYZ.mp3 |
| ⋮ | | ⋮ | | | | | |
| n | DEVICE ID#2 | n | JAZZ | ZJ | ZZ | ZYX | ZYK.mp3 |
| n+1 | DEVICE ID#3 | 1 | POPS | DJ | BB | BCD | BCD.at3 |
| n+2 | DEVICE ID#3 | 2 | POPS | DJ | BB | CDE | CDE.at3 |
| ⋮ | | ⋮ | | | | | |
| m | DEVICE ID#3 | n' | ROCK | MJ | AA | ABC | ABC.at3 |
| m+1 | DEVICE ID#4 | 1 | POPS | XX | CC | FGH | FGH.at3 |
| m+2 | DEVICE ID#4 | 2 | POPS | XX | CC | IJK | IJK.at3 |
| ⋮ | | ⋮ | | | | | |
| N | DEVICE ID#4 | n'' | ROCK | XX | DD | LMN | LMN.at3 |
| N+1 | DEVICE ID#5 | 1 | JAZZ | ZZ | HH | XYZ | XYZ.mp3 |
| ⋮ | | ⋮ | | | | | |
| M | DEVICE ID#5 | n''' | JAZZ | ZZ | JJ | ZYX | ZYX.mp3 |

FIG. 8

| | DEVICE ID | | GENRE | ARTIST | ALBUM | SONG TITLE | FILE NAME | REPRODUCTION STATUS |
|---|---|---|---|---|---|---|---|---|
| 1 | DEVICE ID#2 | 1 | ROCK | MJ | AA | ABC | ABC.mp3 | UNDERWAY |
| 2 | DEVICE ID#2 | 2 | ROCK | MJ | AA | XYZ | XYZ.mp3 | NOT YET |
| ⋮ | | ⋮ | | | | | | |
| n | DEVICE ID#2 | n | JAZZ | ZJ | ZZ | ZYK | ZYX.mp3 | NOT YET |
| n+1 | DEVICE ID#3 | 1 | POPS | DJ | BB | BCD | BCD.at3 | NOT YET |
| n+2 | DEVICE ID#3 | 2 | POPS | DJ | BB | CDE | CDE.at3 | NOT YET |
| ⋮ | | ⋮ | | | | | | |
| m | DEVICE ID#3 | n' | ROCK | MJ | AA | ABC | ABC.at3 | COMPLETE |
| m+1 | DEVICE ID#4 | 1 | POPS | XX | CC | FGH | FGH.at3 | NOT YET |
| m+2 | DEVICE ID#4 | 2 | POPS | XX | CC | IJK | IJK.at3 | NOT YET |
| ⋮ | | ⋮ | | | | | | |
| N | DEVICE ID#4 | n'' | ROCK | XX | DD | LMN | LMN.at3 | COMPLETE |
| N+1 | DEVICE ID#5 | 1 | JAZZ | ZZ | HH | XYZ | XYZ.mp3 | NOT YET |
| ⋮ | | ⋮ | | | | | | |
| M | DEVICE ID#5 | n''' | JAZZ | ZJ | ZZ | ZYX | ZYX.mp3 | COMPLETE |

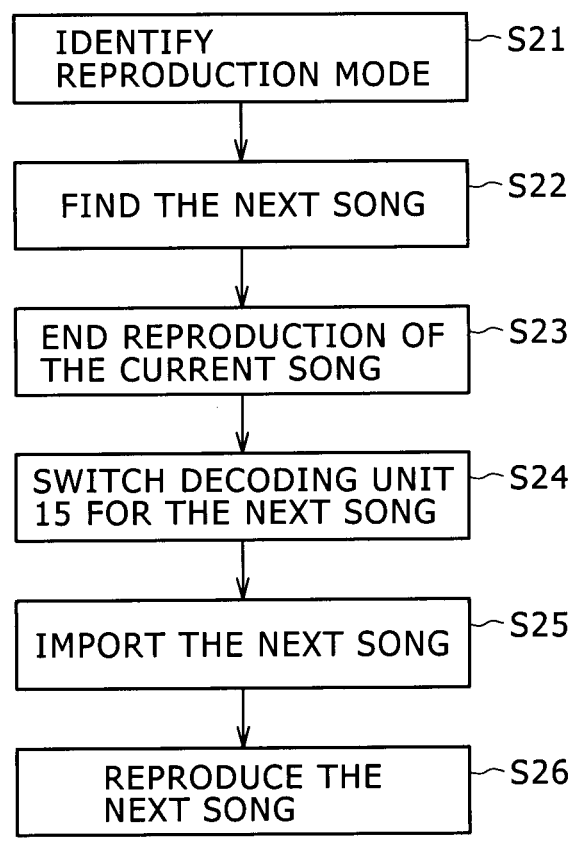

REPRODUCING APPARATUS AND REPRODUCING METHOD

CROSS REFERENCES TO RELATED APPLICATIONS

The present invention contains subject matter related to Japanese Patent Application JP 2006-347781 filed with the Japan Patent Office on Dec. 25, 2006, the entire contents of which being incorporated herein by reference.

BACKGROUND OF THE INVENTION

1. Field of the Invention

The present invention relates to a reproducing apparatus and a reproducing method. More particularly, the invention relates to a reproducing apparatus for connecting a plurality of portable players with reproducing equipment mounted illustratively on board a vehicle.

2. Description of the Related Art

It is a fairly common practice to connect a plurality of audio players such as CD (Compact Disc) changers or MD (Mini Disc) changers illustratively to car audio equipment so that audio data recorded on the CDs or MDs in the changers may be reproduced through the audio equipment. Typically, each of the connected CD or MD changers is controlled individually to reproduce the data from audio equipment.

One such setup is disclosed illustratively in Japanese Patent Laid-open No. 2001-6276. The disclosed setup involves the use of techniques for easily controlling a plurality of audio players connected to a personal computer through an IEEE (Institute of Electrical and Electronics Engineers) 1394 arrangement.

SUMMARY OF THE INVENTION

Where multiple audio players are connected as mentioned above, it has proved to be difficult to perform shuffled play of recorded songs by artist or by genre from one audio player to another. Even if such shuffle play is somehow made possible, a relatively long muted state often takes place between songs due to the need to switch from one disk to another or from one player to another. Such interruptions can be a source of frustration or anxiety for users. Shuffled play is a mode in which the songs registered in a play list are reproduced in random order. Sometimes identical songs are reproduced at short intervals, but still randomly, from different CDs or MDs each carrying the same song by chance. This can be an awkward experience for the user expecting shuffled play.

The above problems are typically circumvented by first importing all audio data from the media of the connected players into a mass memory, then creating file management data about the imported audio data, and reproducing desired audio data based on the file management data thus created. This method involves the time-consuming chores of importing audio data from players at hand and integrating the imported audio data. If the connected players are replaced, their data needs to be imported anew. Such tiresome chores, as well as the need to deal with different players when they are newly connected, are incompatible with vehicle-mounted audio reproduction systems that are supposed to be easily operable.

The present invention has been made in view of the above circumstances and provides a reproducing apparatus and a reproducing method for use therewith, the reproducing apparatus having a plurality of content players connected in such a manner as to make up a system which has no need for importing content data from the connected players or for becoming aware of the differences between the players and which permits access to contents in each of the players while keeping an inordinately prolonged pause from occurring between the accessed contents and inhibiting the same song from being reproduced again during shuffle play.

In carrying out the invention and according to one embodiment thereof, there is provided a reproducing apparatus including: interface means for having a plurality of ports each connectable with a portable player including a storage medium, a reproducing unit and an operating unit, the storage medium being configured to store files of content data and content management data for managing the files, the reproducing unit being configured to reproduce the files; integrated content management data creation means for identifying the portable players connected to the apparatus via the interface means, reading the content management data from the storage medium of each of the identified portable players into a memory, and integrating a plurality of groups of the content management data into a single group within the memory in order to create integrated content management data in which device identification data, attribute data, and file names are associated with each of contents constituted by the content data; reproduction content designation means for designating the content data to be reproduced in accordance with the integrated content management data; content access means for gaining access through the interface means to the designated reproduction content found on the storage medium of one of the portable players based on the device identification data and on the file names; and reproduction means for reproducing the accessed content.

According to another embodiment of the present invention, there is provided a reproducing method including the steps of: having each of a plurality of ports of interface means connected with a portable player including a storage medium, a reproducing unit and an operating unit, the storage medium being configured to store files of content data and content management data for managing the files, the reproducing unit being configured to reproduce the files; identifying the connected portable players based on device identification data retrieved from the portable players; reading the content management data from the storage medium of each of the connected portable players into a memory; integrating a plurality of groups of the content management data into a single group within the memory in order to create integrated content management data in which the device identification data, attribute data, and file names are associated with each of contents constituted by the content data; designating the content data to be reproduced in accordance with the integrated content management data; gaining access through the interface means to the designated reproduction content found on the storage medium of one of the portable players based on the device identification data and on the file names; and reproducing the accessed content.

As outlined above, the inventive reproducing apparatus operating in conjunction with the inventive reproducing method reads the content management data from each of a plurality of portable players connected with the apparatus into the memory, integrates the retrieved content management data into integrated content management data, and designates songs to be reproduced on the basis of the integrated management data thus created. The inventive apparatus allows many more contents to be reproduced than the single portable player setup and can reproduce contents in seamless fashion, without becoming aware of the different portable players being connected. Since target contents are selected based on the integrated content management data, there is no need to perform operations to switch from one player to another for reproduction. The contents found on the storage medium of each of the multiple portable players are thus reproduced automatically.

BRIEF DESCRIPTION OF THE DRAWINGS

Further objects and advantages of the present invention will become apparent upon a reading of the following description and appended drawings in which:

FIG. 5 is a tabular view showing typical content management data for use by embodiments of the present invention;

FIGS. 6A and 6B are tabular views showing other typical content management data for use by embodiments of the present invention;

FIG. 7 is a tabular view showing typical integrated content management data for use by embodiments of the present invention;

FIG. 8 is a tabular view showing other typical integrated content management data for use by embodiments of the present invention;

FIG. 10 is a flowchart of steps constituting a typical procedure performed by embodiments of the present invention for content reproduction.

DETAILED DESCRIPTION OF THE PREFERRED EMBODIMENTS

Figure 1:
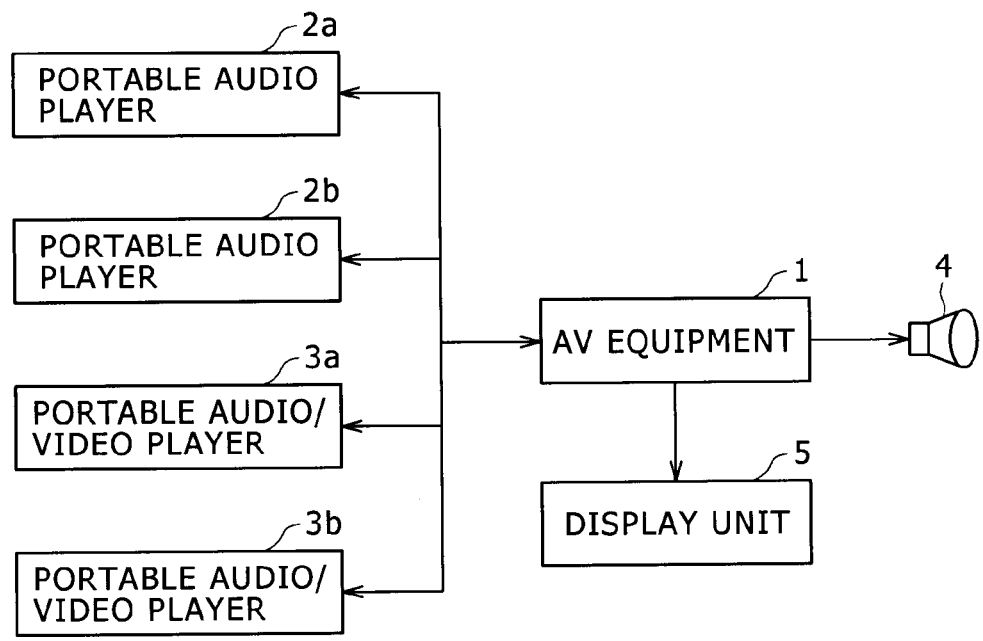
FIG. 1 is a block diagram explanatory of a typical reproducing system embodying the present invention.

Preferred embodiments of the present invention will now be described. FIG. 1 is a block diagram outlining a typical reproducing system embodying the present invention. This system is constituted by main AV (audio-visual) equipment 1 connected to a plurality of content reproducing apparatuses. Contents in this context refer to audio information, video information, and other products created and offered by the media or by networks. The content reproducing apparatuses are illustratively portable music players 2a and 2b as well as portable audio/video players 3a and 3b connected to the AV equipment 1 through an interface.

The interface is implemented in wired or wireless fashion. Typical wired interfaces include USB (Universal Serial Bus) and IEEE (Institute of Electrical and Electronic Engineers) 1394 arrangements. Typical wireless interfaces include Bluetooth (registered trademark), wireless LAN (Local Area Network), and UWB (Ultra Wide Band) setups. Through the interface, content data is transferred (streamed) and content management data is transmitted.

The AV equipment 1 is a main component of the system and may typically be car audio equipment (main unit) or a personal computer. The AV equipment 1 has the interface for connecting with a plurality of portable audio and/or video players, and decoders and amplifiers compatible with various data compression standards. A reproduced audio signal is reproduced through speakers 4 and a reproduced video signal is displayed on a display unit 5. The display unit 5 is capable of displaying a list of reproducible contents and their attributes based on integrated content management data that will be created.

The portable audio players 2a and 2b are each made up of a storage medium such as a flash memory (memory card or internal flash memory) or a hard disk for recording digital audio data and/or digital video data, a file system for managing a plurality of files, a decoding unit for decoding compression-encoded files, an audio amplifier, a display control circuit, a display unit, an operating unit formed by buttons and other controls, and a battery serving as a power source. Typically, the portable audio player may be a digital audio player or a mobile phone. The portable audio/video players 3a and 3b are each constituted, in addition to the components noted above, by a display control circuit for video reproduction and a display unit. Each portable audio/video player is capable of randomly accessing data on its storage medium.

Video data may be compressed illustratively using the MPEG-2 (Moving Picture Experts Group Phase 2), MPEG-4, H.264/AVC (Advanced Video Coding), or DivX standard. Audio data may be compressed typically according to the MP3 (MPEG-1 Audio Layer 3), AAC (Advanced Audio Coding), ATRAC (Adaptive Transfer Acoustic Coding), or WMA (Windows (registered trademark) Media Audio) standard.

The storage medium in each of the portable audio players 2a and 2b holds audio content data and content management data for managing the audio content data. The storage medium in each of the portable audio/video players 3a and 3b retains audio/video content data and content management data for managing the audio/video content data. Furthermore, the portable audio players 2a and 2b as well as the portable audio/video players 3a and 3b have device identification data for identifying each player. USB devices are each assigned a manufacturer ID and a product ID, both of which may be used as the device identification data. Bluetooth devices are each furnished with a BD (Bluetooth Device) address unique to the device in question.

Illustratively, the file system for managing audio files may be either a proprietary file system or a general-purpose file format such as FAT (File Allocation Table) 16 or FAT 33 for use by personal computers. If the proprietary file system is adopted, audio files are transferred only by dedicated transfer software; if the general-purpose file format is utilized, then audio files are transferred by a general-purpose file management tool such as Explorer. The AV equipment 1 as part of the embodiment of this invention complies with all types of portable players whether they employ the proprietary file system or general-purpose file format.

Where the portable audio player is connected to a USB device, the player retains WMA files or the like as data files in a USB storage on its storage medium. When this type of portable audio player is connected to the AV equipment 1, the operating unit of the AV equipment 1 may be operated to designate a song or songs to be reproduced through the USB arrangement. Where the portable audio player adopts proprietary software, the software is installed in the AV equipment 1 in advance. If different portable audio players utilize proprietary software each, then the AV equipment 1 is designed to start the corresponding software whenever one such portable audio player is connected and identified. The same holds for portable audio/video players. The AV equipment 1 is capable of reproducing contents subject to DRM (Digital Rights Management).

The AV equipment 1 has means (function) for identifying the ports connected with the portable audio players 2a and 2b as well as the portable audio/video players 3a and 3b, and identifying the connected players by reading their device identification data. The AV equipment 1 also has means (function) for acquiring content management data from the connected players preparatory to retrieving content data therefrom for reproduction, and interpreting such attribute data as song information, artist names, and genres of the contents based on the acquired content management data. Such means (functions) may be constituted by general-purpose file management tools or by proprietary software as discussed above. In any case, the AV equipment 1 can access and retrieve the content management data from the connected players.

Figure 2:
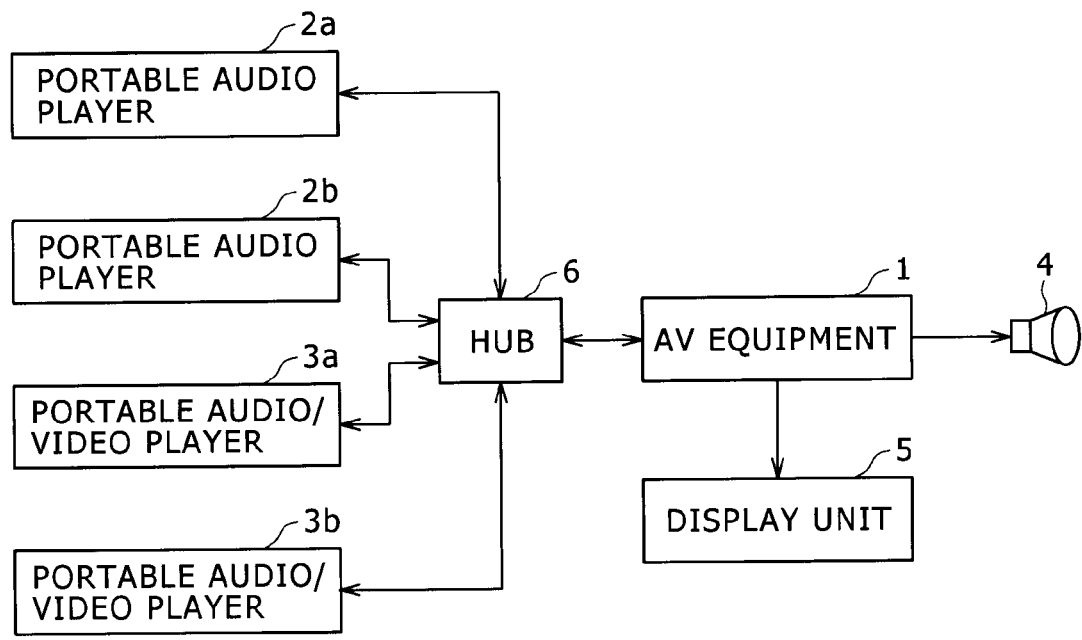
FIG. 2 is a block diagram explanatory of another typical reproducing system embodying the present invention.
Figure 3:
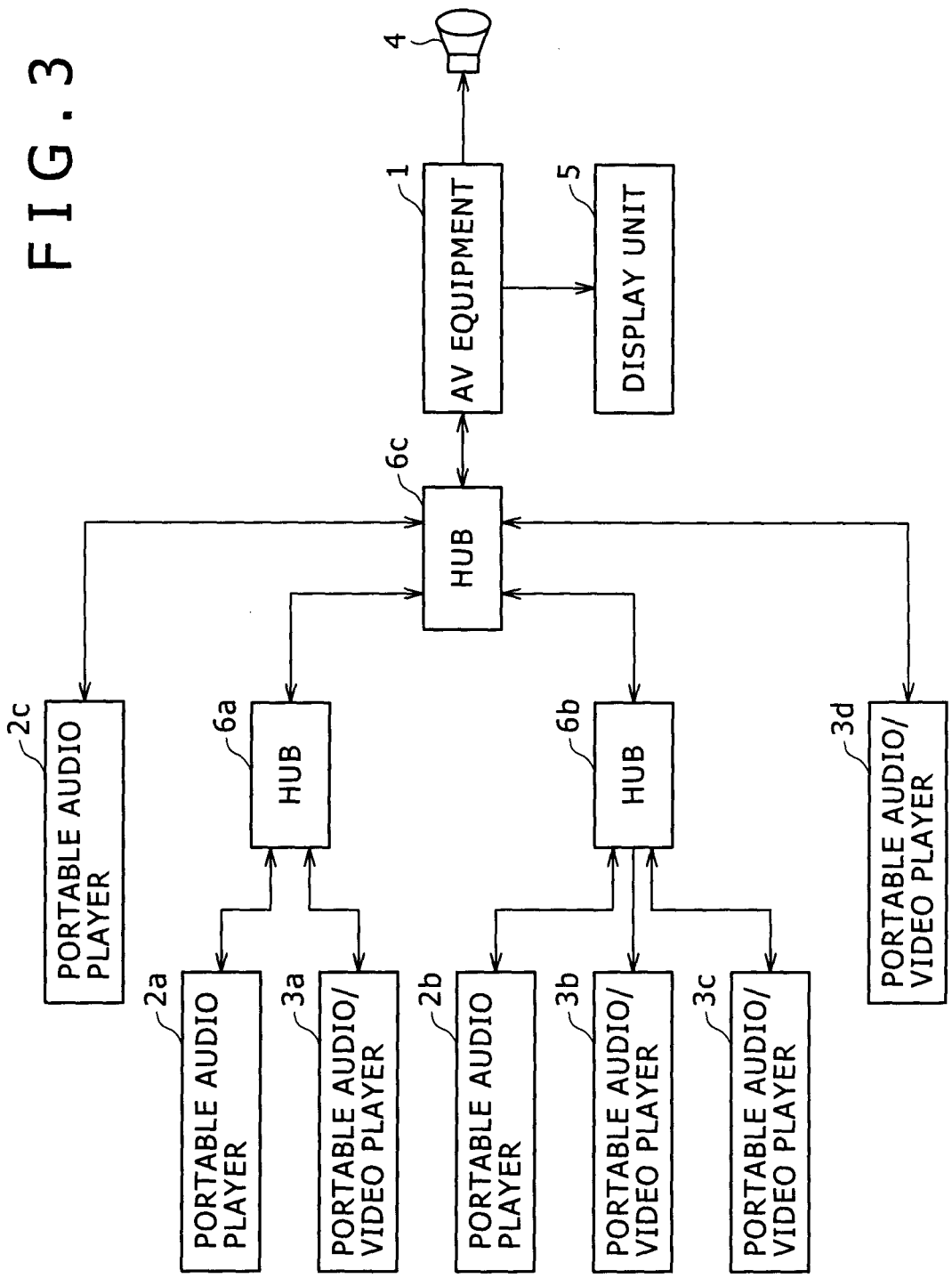
FIG. 3 is a block diagram explanatory of another typical reproducing system embodying the present invention.

The audio reproducing system is not limited structurally to the setup shown in FIG. 1. Alternative systems are shown in FIGS. 2 and 3. FIG. 2 shows an example in which the portable audio players 2a and 2b as well as the portable audio/video players 3a and 3b are connected via a USB hub 6 using the USB interface. The USB hub 6 has one USB port connected to the AV equipment 1 and a plurality of USB ports connectable with the players. In isochronous transfer mode with the USB interface in effect, data may be transferred at speeds of up to 12 Mbps.

Since each USB hub permits a tree-like connection structure, USB hubs 6a, 6b and 6c may be interconnected in a tree-like pattern as shown in FIG. 3. The USB hub 6c is connected with the USB hubs 6a and 6b, portable audio player 2c, and portable audio/video player 3d; the USB hub 6a is connected with the portable audio player 2a and portable audio/video player 3a; and the USB hub 6b is connected with the portable audio player 2b and portable audio/video players 3b and 3c.

The AV equipment 1 itself may be furnished with the added functions of acquiring contents and content management data and storing them into a memory following their retrieval from a storage medium or through downloads over the network. In such cases, the acquired content management data is blended into integrated content management data, to be described later.

A typical structure of the AV equipment 1 will be described below by referring to FIG. 4. The AV equipment 1 has an interface 11 (e.g., USB interface) that interfaces to portable players (portable audio players 2a and 2b, and portable audio/video players 3a and 3b). Through the interfaced 11, a controller 12 reads device identification data and content management data from the connected devices. Each portable player retains content management data wherein content data IDs, content data attributes (genres, artist names, album titles, song titles, and file names), and data storage locations are associated with each of the contents held on the storage medium. The content management data is imported from each portable player into the AV equipment 1.

Of the content management data, certain attributes such as the data about the storage addresses of contents may be kept from being imported. Such attributes are not needed if the portable player is given an instruction to designate a target content using a content ID so that the portable player can recognize where the content in question is located on its storage medium. The content data itself need not be read by the AV equipment 1 from any portable player being connected.

The controller 12 provides the functions of integrated content management data creation means, reproduction content designation means, and content access means. The integrated content management data creation means identifies the portable players connected via interface means n, reads the content management data from the storage medium of each of the identified portable players into a memory, and integrates a plurality of groups of the content management data into a single group within the memory in order to create integrated content management data in which device identification data, attribute data, and file names are associated with each of the contents constituted by the content data. With a desired reproduction mode specified, the reproduction content designation means designates the content data to be reproduced in accordance with the integrated content management data. The content access means gains access through the interface means to the designated reproduction content found on the storage medium of one of the portable players based on the device identification data and on the file names.

The controller 12 is typically made up of a CPU (central processing unit), a ROM (read only memory), and a RAM (random access memory). The ROM stores in advance the programs to be run by the CPU and the data necessary to operate the programs. The RAM serves as a work memory for use by the CPU. The CPU reads programs and data from the ROM as occasions demand and, using the RAM as the work memory, controls the components of the AV equipment 1. A memory 13 of a relatively large capacity and an operating unit 14 are connected to the controller 12. The memory 13 may be a nonvolatile memory.

The operating unit 14 includes keys, a remote controller, and other controls to be operated by the user. When the user operates such keys or remote controller buttons, operation information reflecting the operations is generated and sent to the controller 12. The operation information includes information for designating a menu, a reproduction mode, contents to be reproduced, and a sound level. Illustratively, a GUI is provided through the use of the display unit 5. Audio contents may be reproduced in one of two principal modes: sequential play mode in which songs are reproduced as sequenced by the content management data, and shuffled play mode in which songs are reproduced randomly. It is also possible to reproduce contents by genre, by artist name, or by album title. When the user designates the desired reproduction mode, songs are automatically reproduced according to the selected mode.

The controller 12 identifies the connected portable players based on the device identification data read from the players. The content management data retrieved from the portable players is stored and analyzed. In the case of audio contents, the content management data is analyzed in terms of content-related attributes such as song information, artist names, and genres. A content management database is created and stored illustratively in the memory 13.

When the user operates the operating unit 14 of the AV equipment 1 to designate a desired content, control information for identifying the designated content is sent through the interface 11 to the portable player that retains the content in question. Given the control information, the portable player accesses the designated content and reproduces the content data. The reproduced content data is transferred to the controller 12 of the AV equipment 1 through the interface 11.

The controller 12 in turn forwards compression-encoded content data to a decoding unit 15. The decoding unit 15 decompresses the encoded content data. Since a plurality of portable audio players and portable audio/video players are connectable through the interface, there can be a plurality of compression-encoding standards to be complied with. The decoding unit 15 is thus designed to perform decoding according to multiple standards. The decoding unit 15 need not be structured solely by hardware; it may be constituted by software. For example, suitable DSP programs may be designated selectively under control of a DSP (digital signal processor) and of the controller 12 to deal with decoding according to the multiple compression-encoding standards.

Based on the device identification data, content management data or content data having been imported, the controller 12 determines which compression-encoding standard is in effect and supplies the decoding unit 15 with coding identification information indicating the encoding standard in use. Given the encoding identification information, the decoding unit 15 decodes the compression-encoded content data accordingly. It is also possible first to acquire the content management data from the data decoded by the decoding unit 15 and then to supply the acquired content management data to the controller 12.

A digital audio signal derived from decoding by the decoding unit 15 is sent to an electronic volume control 17 for sound level adjustment. The signal forwarded by the electronic volume control 17 to a D/A converter 18 is converted thereby to an analog audio signal. The analog audio signal thus acquired is fed to the speakers 4 through an amplifier 18. The electronic volume control 17 is controlled by the controller 12. A digital video signal derived from decoding by the decoding unit 15 is supplied to the display unit 5 through the display control unit 20. The display unit 5 displays reproduced images. The display control unit 20 is controlled by the controller 12.

Figure 4:
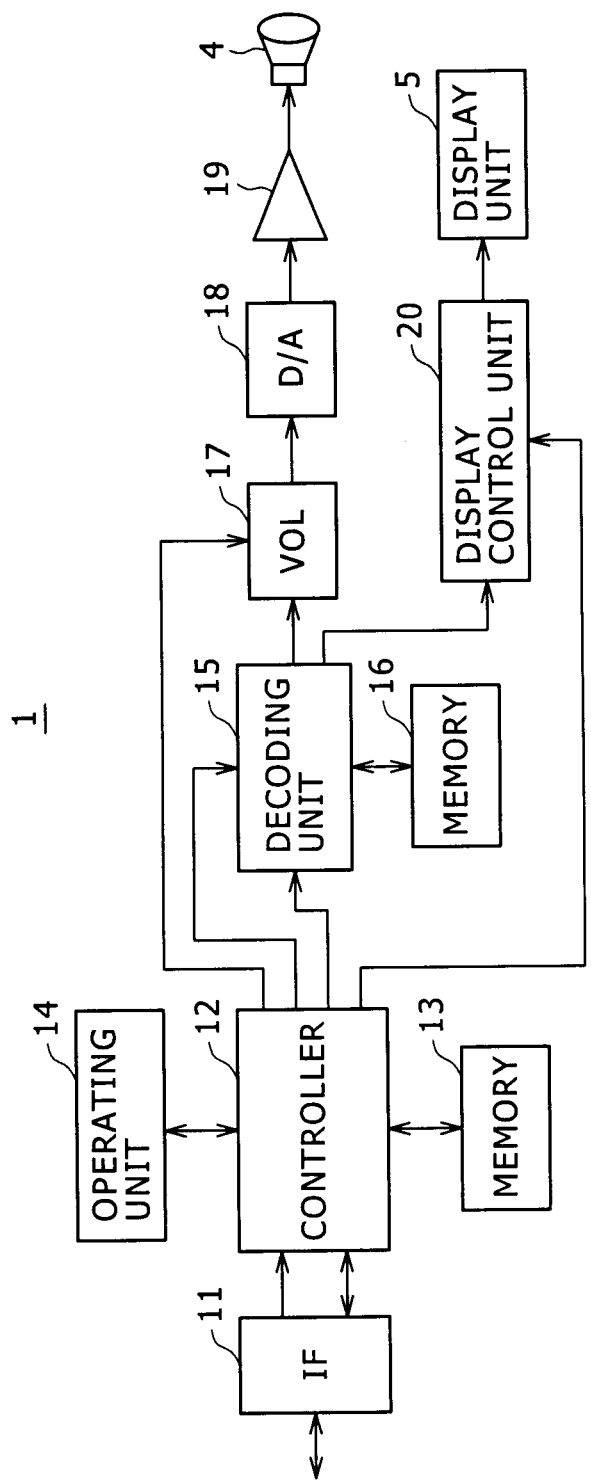
FIG. 4 is a block diagram showing a typical structure of AV equipment embodying the present invention.

FIG. 4 shows one typical structure of the AV equipment 1; other structures are also feasible. For example, the controller may be composed of a CPU whose bus may be connected to a memory, an interface, a decoding unit, a D/A converter, a display unit, and an operating unit.

FIG. 5 shows typical content management data used by the portable audio player (2a or 2b). As many as N songs (files) identifiable by content IDs (1, 2, 3, N) are each associated with such attribute information as a genre, an artist name, an album title, a song title, and a file name. Although not shown in FIG. 5, the locations of the audio contents found on the storage medium are also associated with the corresponding songs being stored.

Illustratively, the song identified by the content ID of "1" has attribute information formed by "ROCK, "MJ," "AA," "ABC," and "ABC.mp3." These alphabetic characters are given here for illustration purposes and have no specific meaning except for file name extensions that designate the compression-encoding standards adopted for the corresponding songs (files). The file name extension in the preceding example indicates MP3 as the compression-encoding standard in effect. Another extension "at3" stands for ATRAC3 and "mp4" for MPEG-4.

FIGS. 6A and 6B show typical content management data used by the portable audio/video player (3a or 3b). In this case, audio management data (FIG. 6A) is separated from video management data (FIG. 6B). With the audio management data, as in the example of FIG. 5, as many as N songs (files) are each associated with the attribute information made up of a genre, an artist name, an album title, a song title, and a file name. With the video management data, as many as N recorded programs (files) are each associated with attribute information formed by a genre, a director name, a title, and a file name. The extension of a file name indicates the compression-encoding standard adopted for the program (file) in question. For example, the extension "mpg" indicates that the file of interest is compression-encoded in MPEG-4 format. Although not shown in FIG. 6A or 6B, the locations of the video contents found on the storage medium are also associated with the corresponding programs being stored.

When portable players are connected to the AV equipment 1, they are identified by the controller 12 of the equipment 1. The content management data (e.g., content IDs and attribute data) of each connected player is then read into the AV equipment 1. A plurality of groups of content management data imported from a plurality of portable players are interpreted by the AV equipment 1 (i.e., by controller 12) in terms of content IDs and attribute information, before being organized into integrated content management data. Files are managed on the basis of the integrated content management data thus created. For example, the multiple reproduction modes mentioned above are brought about in keeping with the integrated content management data.

FIG. 7 shows typical integrated content management data for use when contents are music (i.e., songs). Content management data is read into the AV equipment 1 from four portable audio players having device IDs of "ID#2," ID#3," "ID#4," and "ID#5." Multiple groups of content management data read from the multiple players are arranged in the order in which the devices have been connected to the AV equipment 1, or in ascending or descending order of the device IDs of the connected players. For example, the items of attribute information about "n" songs (files with content IDs of "1," 2 . . . , "n") read from the portable audio player having the device ID of "ID#2" are first arranged into sequence. The attribute information is the same as that which was discussed above.

Then the items of attribute information about "n'" songs (files with content IDs of "1," "2," . . . , "n'") read from the portable audio player having the device ID of "ID#3" are arranged into sequence. Thereafter, the items of attribute information about "n"n" songs (files with content IDs of "1," "2," . . . , "n'''") read from the portable audio player having the device ID of "ID#4" are arranged into sequence. After this, the items of attribute information about "n''''" songs (files with content IDs of "1," "2," . . . , "n''''") read from the portable audio player having the device ID of "ID#5" are arranged into sequence. Finally, with these groups of attribute information organized into integrated content management data, the songs are associated consecutively with new content IDs of "1," "2," "3," . . . , "n," "n+1," . . . , "m," "m+1," . . . , "N" "N+1," . . . , "M."

As described, in the content management data read from the multiple portable players, the data of each song can be identified by a device ID and a content ID. Although the same content ID could be used inadvertently by different portable players, the different device IDs allow the contents in question to be distinguished from one another. In the portable player with the same device ID, the content IDs usually do not overlap.

As shown in FIG. 8, it is possible to have the integrated content management data in FIG. 7 supplemented with reproduction status flags corresponding to the individual songs, each flag indicating whether the corresponding song has been reproduced or has yet to be reproduced. In FIG. 8, one status flag indicates that reproduction of the content having the content ID of "1" and the device ID of "ID#2" is currently "underway." The other status flags indicate that the reproduction is "not yet" complete or "complete."

Within the integrated content management data, a search is made for the same content data that has the reproduction-underway status flag. The search is targeted for the songs with their status flags indicating "not yet." Suppose that content data having an identical song title as part of its attribute information is found by search. In the example of FIG. 8, the content with the song title "ABC" (designated by the device ID of "ID#3" and content ID of "n'") is identified as the same song. In such a case, the status flag of the song "ABC" is set for "complete." The search for the same song may be carried out in terms of not only one attribute but also a plurality of attributes (e.g., artist name and genre). Although not shown in the drawings, it is also possible to check for the same song among the candidate songs by comparing their playing times. When status flags are added to the songs, the user may prioritize a plurality of compression-encoding standards so as to give precedence to reproduction of the content data encoded by a desired standard.

Whereas the integrated content management data discussed so far applies only to audio data, similarly integrated content management data may be created for video data as well. Two groups of integrated content management data may be prepared separately for audio and video data. Alternatively, these groups of data may be organized into a single mixture of integrated content management data for both audio and video data.

The integrated content management data described above is displayed as occasions demand on the display unit 5. The song being reproduced is displayed distinct from the other songs. For example, the title of the currently playing song may be highlighted. There may be diverse modes in which to reproduce songs. In sequential play mode, songs may be reproduced in the order in which they are arranged in the integrated content management data. In shuffled play mode, songs may be reproduced randomly. In genre-specific play mode, only the songs of a particular genre may be reproduced sequentially or randomly. In artist-specific play mode, only the song of a particular artist may be reproduced sequentially or randomly. In album-specific play mode, only the songs of a particular album may be reproduced sequentially or randomly. With any of these reproduction modes in effect, when particular songs are selected to be reproduced, a play list made up of the selected songs may be displayed.

Where the status flags are established as shown in FIG. 8, only the songs with their flags set for "not yet" are reproduced. This prevents the same song from getting played twice or more. The songs with their status flags set for "complete" may be removed from the display. When the songs to be reproduced are selected in genre-specific, artist-specific, or album-specific play mode, a play list constituted by only the selected songs may be displayed.

Figure 9:
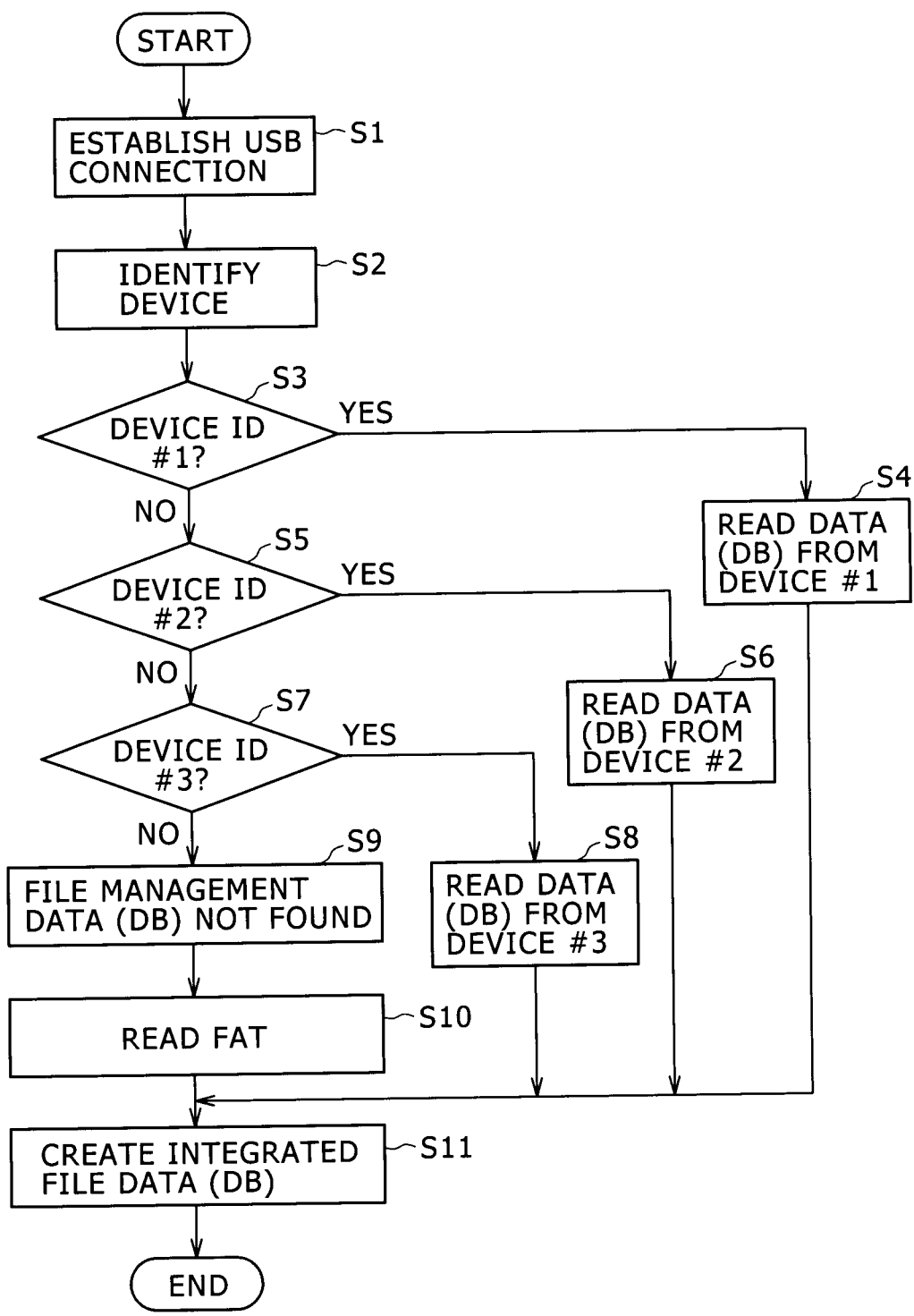
FIG. 9 is a flowchart of steps constituting a typical procedure performed by embodiments of the present invention for creating integrated content management data.

Described below in reference to the flowchart of FIG. 9 is what typically takes place when a portable player is connected to the AV equipment 1. The control operations outlined by the flowchart are carried out by the controller 12 of the Av equipment 1.

In step S1, a portable player is connected through a USB port to the AV equipment 1. In step S2, the controller 12 acquires the device ID from the connected portable player in order to recognize its identity. In step S3, a check is made to determine whether the device ID of the connected device is #1. If the device ID of the connected device is found to be #1, then step S4 is reached. In step S4, the content management data (also noted as DB in FIG. 9 because the management data serves much like a database) is read from the portable player into the memory 13. Although a manufacturer may assign the same device ID to multiple devices that happen to be connected to the AV equipment 1, the different ports being used allow the devices to be distinguished from one another.

If in step S3 the device ID of the connected device is not found to be #1, then step S5 is reached. In step S5, a check is made to determine whether the device ID of the connected device is #2. If the device ID of the connected device is found to be #2, then step S6 is reached. In step S6, the content management data is read from the portable player into the memory 13.

If in step S5 the device ID of the connected device is not found to be #2, then step S7 is reached. In step S7, a check is made to determine whether the device ID of the connected device is #3. If the device ID of the connected device is found to be #3, then step S8 is reached. In step S8, the content management data is read from the portable player into the memory 13. The example of FIG. 9 involves three devices to be identified for purpose of simplification and illustration.

If in step S7 the device ID of the connected device is not found to be #3, then step S9 is reached. In step S9, the connected portable player is found to be a device that has no content management data, such as a USB memory. Step S9 is followed by step S10 in which the FAT of the file management system is read into the memory 13.

After the content management data has been read into the memory 13, step S11 is reached in which integrated content management data is created. This brings the processing of FIG. 9 to an end. The procedure for creating integrated content management data is carried out every time a portable player is connected to the AV equipment 1. What is stored in the memory 13 is deleted when power is removed; the memory 13 is initialized when power is applied. If the memory 13 is arranged to be a nonvolatile memory, then the content management data from the previously connected portable players remains stored. If any one of such players is again connected, only the updates in the content management data are read into the memory 13.

Described below in reference to FIG. 10 is a typical procedure made up of operations for reproducing songs, carried out under control of the controller 12. In step S21, the currently effective reproduction mode is recognized. The reproduction mode in effect determines the songs to be reproduced and the order in which they are reproduced. In step S22, the next song to be reproduced is found by referring to the integrated content management data having been created. The compression-encoding standard applicable to the next song to be played is known from the file name extension of the song.

In step S23, reproduction of the current song is terminated. Step S23 is followed by step S24 in which the decoding unit 15 is switched for the compression-encoding standard of the next song preparatory to its reproduction. In the transition state in which the decoding unit 15 is being switched, the import of the song data from outside or the output of the song data by the controller 12 is temporarily stopped. Upon completion of the switching of the decoding unit 15, step S25 is reached. In step S25, the next song is imported. In step S26, the song of interest is reproduced. Thereafter, the above steps are repeated until all songs have been reproduced or unless an instruction to stop the ongoing reproduction is given.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow. For example, the interface is not limited to supporting USB; such wireless systems as Bluetooth, wireless LAN (Local Area Network), or UWB (Ultra Wide Band) may be adopted alternatively for the interface.

Thus the scope of the invention should be determined by the appended claims and their legal equivalents, rather than by the examples given.

What is claimed is:

1. A reproducing apparatus comprising:
   interface means for connecting with a plurality of portable players, each of the portable players including a storage medium, a reproducing unit, and an operating unit, said storage medium being configured to store files of content data and content management data for managing said files, and said reproducing unit being configured to reproduce said files;

integrated content management data creation means for identifying the portable players connected to the reproducing apparatus via said interface means, reading said content management data from said storage medium of each of the identified portable players into a memory, and integrating a plurality of groups of said content management data into a single group within said memory in order to create integrated content management data, wherein said integrated content management data includes device identification data, attribute data, file names, and a reproduction status flag that are associated with a plurality of contents constituted by said content data;

reproduction content designation means for designating one of the contents to be reproduced in accordance with said integrated content management data and a current playback mode of the reproducing apparatus, the current playback mode designating an order in which the contents are designated;

content access means for gaining access through said interface means to the designated content found on said storage medium of one of said portable players based on said device identification data and on a file name corresponding to the designated content;

reproduction means for reproducing the accessed content; and a controller that searches within the integrated content management data for an entry that references a file that includes content that is identical to the accessed content, and that updates the reproduction status flag for the entry in the integrated content management data to indicate that the file referenced by the entry has been reproduced because of the reproduction of the accessed content.

2. The reproducing apparatus according to claim 1, wherein said integrated content management data creation means identifies each portable player based on said device identification data and on the port found connected with the respective portable player.

3. The reproducing apparatus according to claim 1, wherein said reproducing apparatus is mounted on a vehicle.

4. A reproducing method of a reproducing apparatus comprising:

identifying a plurality of portable players based on device identification data retrieved from said portable players, each of the portable players being connected to an interface section of the reproducing apparatus and including a storage medium, a reproducing unit, and an operating unit, said storage medium being configured to store files of content data and content management data for managing said files, and said reproducing unit being configured to reproduce said files;

reading said content management data from said storage medium of each of the connected portable players into a memory;

integrating a plurality of groups of said content management data into a single group within said memory in order to create integrated content management data, wherein said integrated content management data includes said device identification data, attribute data, file names, and a reproduction status flag that are associated with a plurality of contents constituted by said content data;

designating one of the contents to be reproduced in accordance with said integrated content management data and a current playback mode of the reproducing apparatus, the current playback mode designating an order in which the contents are designated;

gaining access through said interface section to the designated content found on said storage medium of one of said portable players based on said device identification data and on a file name corresponding to the designated content;

reproducing the accessed content;

searching within the integrated content management data for an entry that references a file that includes content that is identical to the accessed content; and updating the reproduction status flag for the entry in the integrated content management data to indicate that the file referenced by the entry has been reproduced because of the reproduction of the accessed content.

5. The reproducing method according to claim 4, wherein said identifying step identifies each portable player based on said device identification data and on the port found connected with the respective portable player.

6. A reproducing apparatus comprising:

an interface section configured to connect with a plurality of portable players, each of the portable players including a storage medium, a reproducing unit, and an operating unit, said storage medium being configured to store files of content data and content management data for managing said files, and said reproducing unit being configured to reproduce said files;

an integrated content management data creation section configured to identify the portable players connected to the reproducing apparatus via said interface section, read said content management data from said storage medium of each of the identified portable players into a memory, and integrate a plurality of groups of said content management data into a single group within said memory in order to create integrated content management data, wherein said integrated content management data includes device identification data, attribute data, file names, and a reproduction status flag that are associated with a plurality of contents constituted by said content data;

a reproduction content designation section configured to designate one of the contents to be reproduced in accordance with said integrated content management data and a current playback mode of the reproducing apparatus, the current playback mode designating an order in which the contents are designated;

a content access section configured to gain access through said interface section to the designated content found on said storage medium of one of said portable players based on said device identification data and on a file name corresponding to the designated content;

a reproduction section configured to reproduce the accessed content; and a controller that searches within the integrated content management data for an entry that references a file that includes content that is identical to the accessed content, and that updates the reproduction status flag for the entry in the integrated content management data to indicate that the file referenced by the entry has been reproduced because of the reproduction of the accessed content.

7. The reproducing apparatus according to claim 6, wherein
the current playback mode of the reproducing apparatus is one of a sequential playback mode and a shuffled playback mode.

8. The reproduction apparatus according to claim 6, wherein the controller determines that the file includes content that is identical to the accessed content based on the file having an identical file name as the accessed content.

9. The reproduction apparatus according to claim 6, wherein the controller determines that the file includes content that is identical to the accessed content based on a playback time of the file being identical to a playback time of the accessed content.

10. The reproduction apparatus according to claim 6, wherein the current playback mode is a shuffled playback mode, and the controller uses reproduction status flags in the integrated content management data to prevent a same content from being reproduced multiple times as part of a shuffled playback.

* * * * *